June 3, 1924.
J. KOZISEK
REGULATION OF ASYNCHRONOUS MACHINES
Filed Aug. 8, 1921
1,496,318
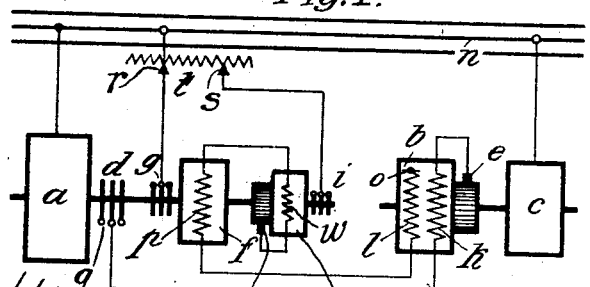
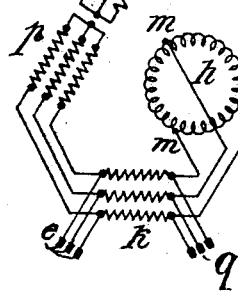
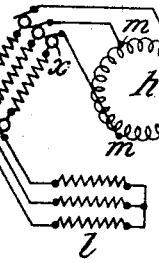
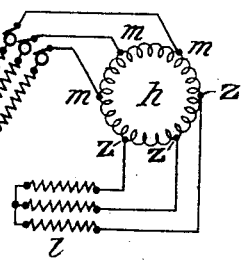
Inventor
Jaroslav Kozisek
by Knight Bro Patented June 3, 1924.

1,496,318

UNITED STATES PATENT OFFICE.

JAROSLAV KOZISEK, OF BERLIN-CHARLOTTENBURG, GERMANY, ASSIGNOR TO SIEMENS-SCHUCKERTWERKE GESELLSCHAFT MIT BESCHRANKTER HAFTUNG, OF SIEMENSSTADT, NEAR BERLIN, GERMANY, A GERMAN CORPORATION.

REGULATION OF ASYNCHRONOUS MACHINES.

Application filed August 8, 1921. Serial No. 490,609.

*To all whom it may concern:*

Be it known that I, JAROSLAV KOZISEK, a citizen of the Austrian Republic, residing at Berlin-Charlottenburg, Germany, have invented certain new and useful Improvements in Regulation of Asynchronous Machines (for which I have filed an application in Germany on August 7th, 1920), of which the following is a specification.

My invention refers to electric machinery and more especially to regulating sets comprising asynchronous machines, to the secondary systems of which are connected auxiliary commutator machines either mechanically coupled to the asynchronous machine (as in the so-called Kramer connection), or mechanically separated therefrom (as in the Scherbius connection). These sets are usually regulated by altering the field of the auxiliary commutator machine, as a rule by means of a regulating transformer for altering the number of revolutions, and by means of a potential regulator for adjusting the correct phase.

To regulate the field of the asynchronous motor through synchronism a frequency converter has heretofore been used to excite the field winding of the auxiliary commutator machine, this arrangement having the advantage that the speed of the asynchronous motor may be regulated through synchronism.

According to my invention I add another exciting machine to the regulating set and connect it in series with the frequency converter. This machine being of the asynchronous type is to be used for regulating the speed of the asynchronous motor in subsynchronism and super-synchronism, only up to the vicinity of synchronism, while the frequency converter is to be used only in vicinity of synchronism and at synchronism itself.

By this arrangement and the method for using it the expensive frequency converter may assume extremely small dimensions. The asynchronous exciter will not complicate matters since it is a machine of simple construction and its regulating device is located in a circuit of high frequency and small currents.

In the drawings attached to this specification and forming part thereof the invention is represented diagrammatically by way of example.

Figure 1 represents the total arrangement of a regulating set according to my invention;

Figures 2, 3 and 4 represent three different ways of combining the auxiliary commutator machine with the asynchronous exciter machine and the frequency converter.

For the matter of clearness in Figure 1 the connections of the machines are indicated for one phase only. $a$ indicates the asynchronous main machine. The slip currents are led over the slip rings $d$ to the auxiliary commutator machine $b$ having a stator winding $l$ and commutator brushes $e$. The auxiliary commutator machine forms part of an energy converter, the second part $c$ (in the present case an asynchronous machine) of which is coupled with it and connected to the net $n$. The auxiliary machine $b$ is also provided with a compensating winding $k$ for counteracting the armature field. The exciting winding $l$ with the neutral point $o$ is supplied with current by the two exciting machines $f$ and $h$, the first being an asynchronous machine, the second a frequency converter. Both machines are connected in series and mechanically coupled to the motor $a$ in the arrangement shown. The rotors of both machines are electrically connected to the net $n$ by the slip rings $g$ and $i$. There are means provided to regulate the voltage impressed upon the two exciters. For this purpose a regulating transformer $t$ is arranged between the two machines and the net, separate adjustable branches $r$ and $s$ being provided to take the voltages for the two machines off the transformer independently from each other.

Regulation may now be performed preferably in such manner, that in the wider ranges of adjustment below and above synchronism excitation is supplied substantially by machine $f$, for the narrower ranges adjacent to synchronism and at synchronism itself, however, entirely or partly by the frequency converter $h$.

Evidently the frequency converter $h$, which is to be considered solely for excitation in the ranges approaching synchronism, may be dimensioned for low voltages only, that means, it may be of very small size, and its regulating devices will, therefore, be correspondingly small and, as a result, changing-over will be satisfactory. On the other hand, the excitation will be performed substantially by a machine $f$ void of communication and, consequently, cheap and safe in working.

In order to still further relieve the regulating devices and the slip rings $i$ of the frequency converter, and in order to further improve its commutation, I prefer providing its stator, with a compensating winding $w$ for neutralizing the armature field of the working currents, which winding is connected into the circuit of these currents. Now the frequency converter is supplied from the net, by way of the slip rings, exclusively with low magnetization currents serving only for the purpose of excitation.

It may, however, prove of advantage also in the arrangement shown in Fig. 1, to combine the two stator windings at the auxiliary machine $b$, i. e. to carry the excitation into the compensating winding $k$. In that case the windings $p$, $k$ and $h$ may be preferably connected in the manner illustrated in Fig. 2, which refers to a three phase arrangement, in which the commutator brushes of the frequency converter $h$ are indicated by the letter $m$. In this manner it will be possible always to work at the machine $f$ with three slip rings only, as shown in Fig. 1.

If, however, the auxiliary machine be provided with a separate field winding $l$, and the rotor of the asynchronous exciter be used as a secondary system, means must be provided by which electrical communication is established between windings $p$ and $l$ and winding $w$ of converter $h$. It will then be necessary to double the number of slip rings (Figure 3) introducing the slip rings $x$ and $y$ for the winding $p$ instead of the slip rings $g$ for the rotor, or else double the number of sets of commutator brushes $m$ at the frequency converter, by providing a second set $z$ (Figure 4). In the latter case only one set of slip rings is provided. This is possible, because the winding of the commutator machine is arranged in circuit between the windings of the two other machines. By this expedient the number of brushes of this machine is thus doubled.

All arrangements described above may be applied in a similar manner also in case the auxiliary commutator machine be coupled mechanically to the asynchronous main machine.

I claim:

1. In combination an asynchronous motor, an auxiliary alternating current commutator machine connected to the secondary of the asynchronous motor, an asynchronous motor for exciting said commutator machine and a frequency converter connected in series with said exciting asynchronous motor.

2. In combination an asynchronous motor, an auxiliary alternating current commutator machine connected to the secondary of the asynchronous motor, an asynchronous motor for exciting said commutator machine and a frequency converter connected in series with said exciting asynchronous motor, the two exciting machines being coupled mechanically with the main asynchronous motor.

3. In combination an asynchronous motor, an auxiliary alternating current commutator machine connected to the secondary of the asynchronous motor, an asynchronous motor for exciting said commutator machine and a frequency converter connected in series with said exciting asynchronous motor, the two exciting units being electrically primarily connected to the current supply for the main asynchronous motor and being mechanically coupled with said motor.

In testimony whereof I affix my signature.

JAROSLAV KOZISEK.